United States Patent
Tamai

(10) Patent No.: US 11,782,860 B2
(45) Date of Patent: Oct. 10, 2023

(54) INFORMATION PROCESSING DEVICE FOR PREVENTING OCCURRENCE OF MEMORY CONTENTION

(71) Applicant: OMRON Corporation, Kyoto (JP)

(72) Inventor: Toshinori Tamai, Nara (JP)

(73) Assignee: OMRON Corporation, Kyoto (JP)

( * ) Notice: Subject to any disclaimer, the term of this patent is extended or adjusted under 35 U.S.C. 154(b) by 9 days.

(21) Appl. No.: 17/605,243

(22) PCT Filed: Mar. 2, 2020

(86) PCT No.: PCT/JP2020/008577
§ 371 (c)(1),
(2) Date: Oct. 21, 2021

(87) PCT Pub. No.: WO2020/230412
PCT Pub. Date: Nov. 19, 2020

(65) Prior Publication Data
US 2022/0214986 A1   Jul. 7, 2022

(30) Foreign Application Priority Data
May 16, 2019   (JP) .................................. 2019-093181

(51) Int. Cl.
*G06F 13/372*   (2006.01)
*G06F 13/16*   (2006.01)
(Continued)

(52) U.S. Cl.
CPC ........ *G06F 13/372* (2013.01); *G06F 13/1668* (2013.01); *G06F 13/28* (2013.01); *G06F 13/4282* (2013.01)

(58) Field of Classification Search
CPC .... G06F 13/1668; G06F 13/28; G06F 13/372; G06F 13/4282
See application file for complete search history.

(56) References Cited

U.S. PATENT DOCUMENTS

| 5,444,855 A | 8/1995 | Thompson |
| 10,887,427 B1 * | 1/2021 | Adnan .................. H04L 67/561 |

(Continued)

FOREIGN PATENT DOCUMENTS

| JP | S5111534 | 1/1976 |
| JP | H0652118 | 2/1994 |

(Continued)

OTHER PUBLICATIONS

International Search Report (Form PCT/ISA/210) of PCT/JP2020/008577, dated Jun. 2, 2020, with English translation thereof, pp. 1-4.

(Continued)

*Primary Examiner* — Eric T Oberly
(74) *Attorney, Agent, or Firm* — JCIPRNET

(57) ABSTRACT

Provided is a unit comprising a DMAC which, on the basis of a signal outputted from a time counting part which operates in synchronization with a time counting part of a PLC, does not communicate a memory via a serial bus in a control cycle of a CPU during at least a first period overlapping a period in which the CPU communicates with the memory, and communicates with the memory via the serial bus during a second period which begins after the first period.

7 Claims, 7 Drawing Sheets

(51) Int. Cl.
*G06F 13/28* (2006.01)
*G06F 13/42* (2006.01)

(56) References Cited

U.S. PATENT DOCUMENTS

| | | | | |
|---|---|---|---|---|
| 2003/0172316 | A1* | 9/2003 | Tremblay | G06F 11/2082 |
| | | | | 714/6.23 |
| 2007/0276983 | A1* | 11/2007 | Zohar | G06F 3/0635 |
| | | | | 711/100 |
| 2014/0112339 | A1* | 4/2014 | Safranek | G06F 12/0808 |
| | | | | 370/389 |
| 2016/0266563 | A1* | 9/2016 | Mizutani | G05B 19/0421 |
| 2017/0199839 | A1 | 7/2017 | Mishra et al. | |
| 2018/0336149 | A1* | 11/2018 | Petersen | G06F 13/368 |
| 2019/0278501 | A1* | 9/2019 | Hibino | H04L 41/082 |

FOREIGN PATENT DOCUMENTS

| | | |
|---|---|---|
| JP | H0991194 | 4/1997 |
| JP | 2005115421 | 4/2005 |
| JP | 2006099214 | 4/2006 |
| WO | 2015056695 | 4/2015 |

OTHER PUBLICATIONS

"Written Opinion of the International Searching Authority (Form PCT/ISA/237) of PCT/ JP2020/008577," dated Jun. 2, 2020, with English translation thereof, pp. 1-8.

"Search Report of Europe Counterpart Application", dated Dec. 21, 2022, pp. 1-12.

* cited by examiner

INFORMATION PROCESSING DEVICE FOR PREVENTING OCCURRENCE OF MEMORY CONTENTION

CROSS-REFERENCE TO RELATED APPLICATION

This application is a 371 application of the International PCT application serial no. PCT/JP2020/008577, filed on Mar. 2, 2020, which claims the priority benefits of Japan Patent Application No. 2019-093181, filed on May 16, 2019. The entirety of each of the above-mentioned patent applications is hereby incorporated by reference herein and made a part of this specification.

TECHNICAL FIELD

The present invention relates to an information processing device operated in cooperation with a control device that executes control of a control object.

BACKGROUND ART

In the related art, in order to reduce a processing load of an industrial controller, an industrial control system of a type that uses various units that operate in cooperation with a controller together is known. In such a system, the controller and the units share the same memory, and the controller or the units may be operated to access the shared memory and read and write data. However, when the controller and the units can access the shared memory in a disorderly fashion, "memory contention" will occur because accesses occur at the same timing, and as a result, reading/writing of data to be processed with priority may be delayed.

Here, in the related art, examples of technologies for avoiding occurrence of such memory contention are proposed in, for example, Patent Literatures 1 and 2.

Patent Literature 1 discloses a memory access arbitration device including a first control unit configured to output a request signal to obtain use permission of the shared memory at a random timing, a second control unit configured to output a request signal to obtain use permission of the shared memory at each constant cycle, and an arbitration unit configured to arbitrate the request signal output from each of the first control unit and second control unit, wherein a determination unit configured to receive the output of the request signal from the second control unit and output an ack prohibition signal that prohibits the arbitration unit from outputting an ack signal to the first control unit to the arbitration unit is provided.

Patent Literature 2 discloses an arbitration system configured to arbitrate use requests of a plurality of devices with respect to a shared resource according to a prescribed priority ranking and selectively permit use of the shared resource, including a time counting part configured to count a time from a use request permission start of a specific device having a need to transfer data within a constant time in the plurality of devices that are arbitration objects to the next use request permission start and generate a timeout signal when it is detected that selection of the use request permission of the specific device is not performed within a predetermined time, and an arbitration unit configured to permit a use request of the specific device at each constant time by changing a priority ranking of the specific device to the highest or at least the second highest according to the timeout signal from the time counting part.

CITATION LIST

Patent Literature

[Patent Literature 1]
Japanese Patent Laid-Open No. 2005-115421
[Patent Literature 2]
Japanese Patent Laid-Open No. H09-91194

SUMMARY OF INVENTION

Technical Problem

In the technology of Patent Literature 1, both of the first control unit and the second control unit need to access the arbitration unit to arbitrate and receive the access to the memory. For this reason, for example, when the first control unit is used as a CPU of an industrial controller, since a processing load (request transmission, ACK reception, or the like) of the CPU for arbitration increases, a control cycle of the CPU becomes longer. As a result, there is a problem that the CPU cannot execute processing at a constant cycle.

Even in the technology of Patent Literature 2, the plurality of devices and the one CPU need to access the arbitration circuit to avoid memory contention. Accordingly, since the processing load (request transmission, ACK reception, or the like) of the CPU for arbitration increases, the control cycle of the CPU becomes longer. As a result, there is a problem that the CPU cannot execute processing at a constant cycle.

In order to solve the above-mentioned problems, an objective of the present invention is to prevent occurrence of memory contention without executing arbitration processing in a computation unit of a control device to prevent the memory contention.

Solution to Problem

An information processing device according to an aspect of the present invention is an information processing device connected to a control device including a first memory connected to a serial bus, a first counter configured to output a first signal for each constant time, and a first communication part connected to the serial bus and configured to communicate with the first memory via the serial bus for a predetermined control cycle based on the first signal, the information processing device including a second counter operated in synchronization with the first counter and configured to output a second signal for the constant time, and a second communication part connected to the serial bus and configured to communicate with the first memory via the serial bus during a second duration started after a first duration without serial communication with the first memory via the serial bus during the first duration at least overlapping a duration in which the first communication part communicates with the first memory in the control cycle based on the second signal.

Advantageous Effects of Invention

According to the aspect of the present invention, it is possible to prevent occurrence of memory contention without executing arbitration processing for preventing memory contention in a computation unit of a control device.

DESCRIPTION OF EMBODIMENTS

Embodiment 1

Hereinafter, an embodiment related to one aspect of the present invention (hereinafter referred to as "the embodiment") will be described with reference to the accompanying drawings.

§ 1 Application Example

Figure 1:
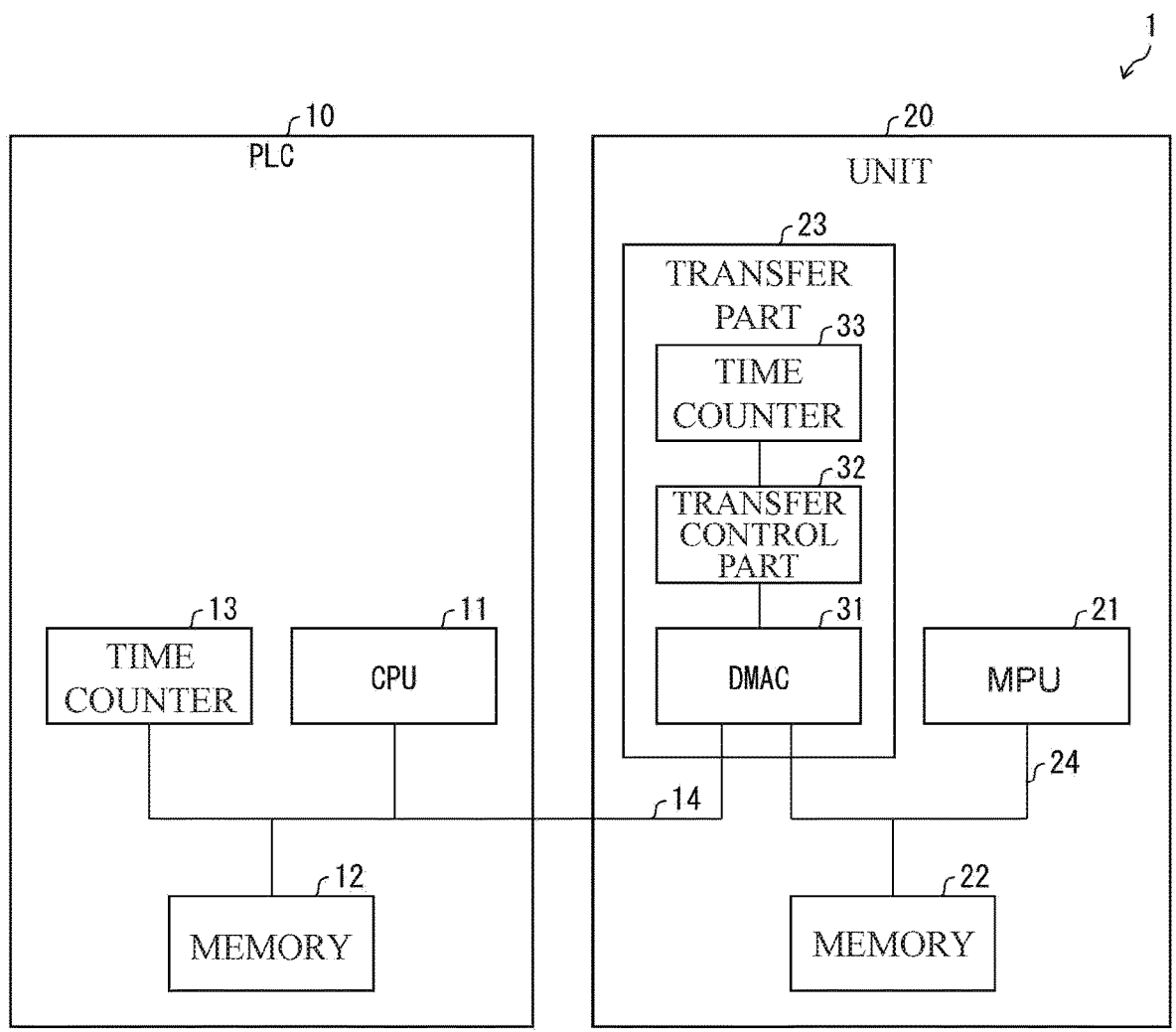
FIG. 1 is a block diagram showing a major part configuration of a control system according to Embodiment 1 of the present invention.

First, an example of a situation to which the present invention is applied will be described with reference to FIGS. 1 and 2. As shown in FIG. 1, a unit 20 according to the embodiment is an information processing device connected to a PLC 10 in a control system 1 and operated in cooperation with the PLC 10. A DMAC 31 in the unit 20 shares a memory 12 in the PLC 10 together with a CPU 11 in the PLC 10, and both communicate with the memory 12 via a serial bus 14. That is, the CPU 11 and the DMAC 31 share the memory 12. A mechanism configured to prevent memory contention between the CPU 11 and the DMAC 31 is incorporated in the control system 1.

Figure 2:
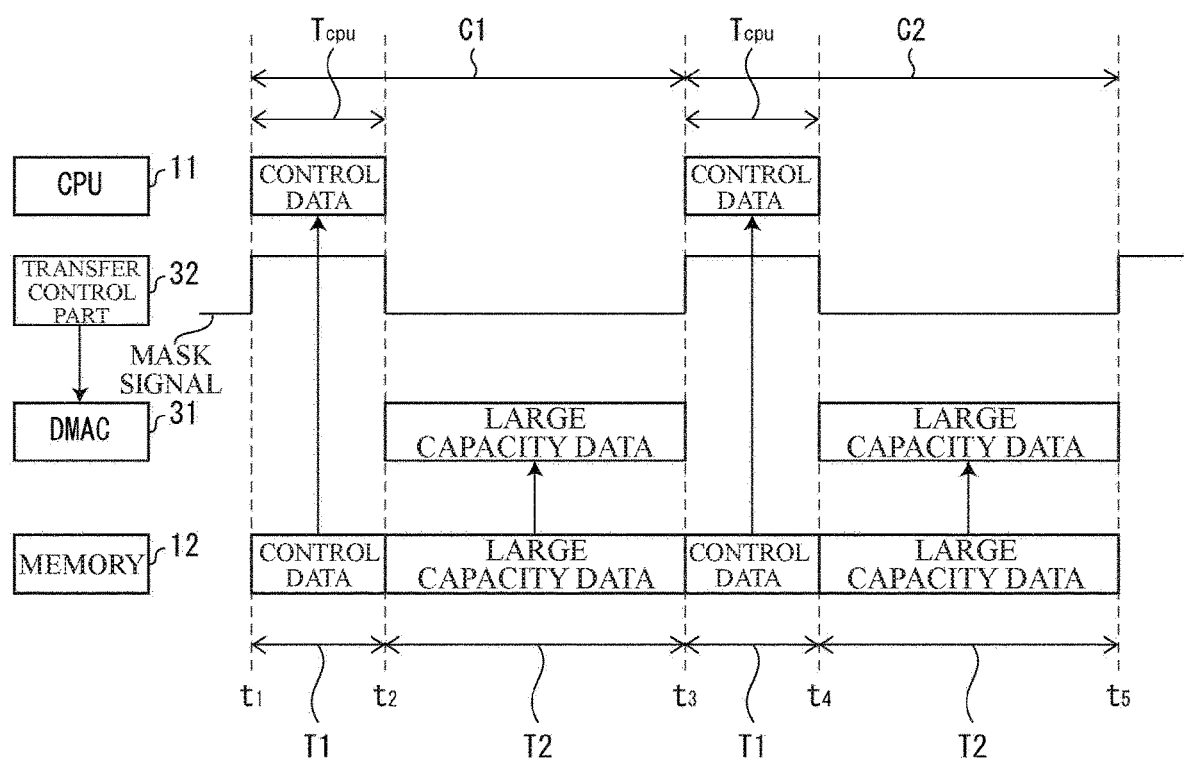
FIG. 2 is a sequence diagram showing an example of a flow of processing by the control system according to Embodiment 1 of the present invention.

As shown in FIG. 2, the unit 20 periodically communicates with the memory 12 at each predetermined control cycle based on the signal output from a time counter 13 in the PLC 10. Accordingly, control data for controlling a control object in the control system 1 is read from the memory 12 and transmitted to the control object.

In the unit 20, a time counter 33 is operated in synchronization with the time counter 13, and outputs an instruction signal for each constant time at the same timing as the time counter 13. A transfer control part 32 in the unit 20 generates a mask signal that designates whether communication with the memory 12 is allowed based on the mask signal output from the time counter 33, and outputs the mask signal to the DMAC 31. A signal level of the mask signal is maintained at a high level during a duration T1 that at least overlaps the duration in which the CPU 11 communicates with the memory 12, and maintained at a low level during a duration T2 started after the duration T1. The DMAC 31 does not communicate with the memory 12 while the mask level is at a high level and communicates with the memory 12 while the mask signal is at a low level. Accordingly, when the CPU 11 communicates with the memory 12, since the DMAC 31 does not communicate with the memory 12, memory contention does not occur.

After the CPU 11 terminates communication with the memory 12, the DMAC 31 communicates with the memory 12. Here, the CPU 11 may communicate with the memory 12 or may not communicate with the memory 12. Accordingly, in the duration T2, occurrence of memory contention is allowed. With this, since it is guaranteed that only the CPU 11 can communicate with the memory 12 while the mask signal is at a high level, the CPU 11 can access the memory 12 with no delay.

As described above, the CPU 11 can periodically access the memory 12 without executing the arbitration processing to prevent memory contention. Since the DMAC 31 determines whether there is access to the memory 12 according to the mask signal generated based on the output of the time counter 33 in synchronization with the time counter 13, there is no need to execute the arbitration processing to prevent memory contention like the CPU 11. In this way, the unit 20 according to the embodiment can avoid the memory contention between the CPU 11 and the DMAC 31 without causing the CPU 11 to perform the arbitration processing for preventing memory contention.

§ 2 Configuration Example (Configuration of Control System 1)

FIG. 1 is a block diagram showing a major part configuration of the control system 1 according to the embodiment. In the example shown, the control system 1 includes the programmable logic controller (PLC) 10 (a control device) and the unit 20. The PLC 10 in FIG. 1 includes the central processing unit (CPU) 11 (a first communication part), the memory 12 (a first memory), the time counter 13 (a first counter), and the serial bus 14. The unit 20 in FIG. 1 includes an MPU 21, a memory 22 (a second memory), and a transfer part 23. The transfer part 23 in FIG. 1 includes the direct memory access controller (DMAC) 31 (a second communication part), the transfer control part 32, the time counter 33 (a second counter), and a serial bus 24.

The control system 1 is a system configured to control production facilities in which a plurality of control objects such as various instruments or facilities (not shown) are installed. The PLC 10 is a type of controller configured to control these control objects in the control system 1. The PLC 10 and the control objects are connected to a network of a control system such as a field network or the like (not shown). The PLC 10 transmits and receives various control data to the control object and thus controls the production facilities by periodically communicating with the control objects via the network of the control system. The PLC 10 further generates large capacity data used for statistics processing or the like of an operational status or the like of the control system 1 based on the data collected from each of the control objects, and stores the data in the memory 12.

The unit 20 is a device connected to the PLC 10 that operates in cooperation with the PLC 10. In the embodiment, for example, the unit 20 takes charge of various types of processing applied to the large capacity data generated by the PLC 10 to reduce the processing load of the CPU 11 of the PLC 10. As such processing, for example, packet division processing, abnormality processing, and the like are exemplified.

(Detailed Configuration of PLC 10)

In the PLC 10, each of the CPU 11, the memory 12, and the time counter 13 is connected to the serial bus 14. One end of the serial bus 14 is connected to the DMAC 31 of the unit 20. The serial bus 14 is a communication route on which serial communication is executed, for example, a Peripheral Component Interconnect express (PCIe) bus.

The CPU 11 is a processor configured to generally control operations of the PLC 10. The memory 12 is any of various types of non-volatile recording media such as a read only memory (ROM) and the like. The time counter 13 has elements such as a watch and a timer.

Control data provided to control the control objects in the control system 1 is stored in the memory 12. The CPU 11 periodically reads the control data from the memory 12 and periodically transmits the data to the control object. The periodicity is realized by the time counter 13. A predetermined initial setting time is set in the time counter 13. When the PLC 10 starts an operation thereof, time counting is started from the initial setting time as a starting point. Then, when the counted number reaches a reference number, in other words, when a constant time elapses after the counting starts, an instruction signal (a first signal) that instructs a periodical operation with respect to the CPU 11 is output to the CPU 11. The CPU 11 starts one control cycle with reception of the instruction signal as a trigger. Then, while the control cycle continues, various types of control to be executed in the cycle (for example, transmission of control data or the like) are executed.

The time counter 13 continues the time counting when the instruction signal is transmitted. Then, when the counted number after transmission of the instruction signal newly reaches a reference number, the instruction signal is newly transmitted to the CPU 11. In this way, the time counter 13 is set to repeatedly output the instruction signal to the CPU 11 at a constant cycle. The CPU 11 terminates the current control cycle when a new instruction signal is received, and immediately starts the next control cycle. As a result, the CPU 11 continues to control the control object at the constant cycle.

In the embodiment, the control cycle of the CPU 11 is a short time of, for example, 125 microseconds or less. That is, the control system 1 of the embodiment is a system in which the PLC 10 periodically controls the control objects frequently.

(Detailed Configuration of Unit 20)

In the unit 20, the MPU 21, the memory 22, and the DMAC 31 are connected to the serial bus 24. The DMAC 31 is also connected to the serial bus 14. The serial bus 24 is, for example, a Peripheral Component Interconnect express (PCIe) bus. Both the CPU 11 and the DMAC 31 are connected to the memory 12 via the serial bus 14, and thus the CPU 11 and the DMAC 31 share the memory 12.

The micro processing unit (MPU) 21 is a processor configured to generally control operations of the unit 20. The MPU 21 executes various types of processing such as the above-mentioned packet division processing, abnormality processing, and the like. The memory 22 is any of various types of non-volatile recording media such as a read only memory (ROM) and the like. The large capacity data or the like transferred from the unit 20 is stored in the memory 22.

The transfer part 23 executes data transfer between the PLC 10 and the unit 20 according to the control by the MPU 21 or the CPU 11. The DMAC 31 in the transfer part 23 takes charge of communication with the memory 12 via the serial bus 14. The DMAC 31 is a controller configured to read and write the large capacity data in the memory 12 by directly accessing the memory 12 with no intervention of the CPU 11. The DMAC 31 transfers, for example, the large capacity data read from the memory 12 to the DMAC 31 through serial communication on the serial bus 14 and further transfers the data to the memory 22 through serial communication on the serial bus 24, and thus writes the data on the memory 22. Alternatively, the DMAC 31 transfers the large capacity data read from the memory 22 to the memory 12 through serial communication on the serial bus 14, and thus can write the data on the memory 12.

The DMAC 31 is realized as an integrated circuit formed independently and separately from the CPU 11. In other words, the PLC 10 and the unit 20 each include independent and separate boards, the CPU 11 is formed on the board that constitutes the PLC 10, and the DMAC 31 is formed on the board that constitutes the unit 20. In this way, the CPU 11 and the DMAC 31 are independent and separate devices (apparatuses).

The time counter 33 has elements such as a watch and a timer. In the embodiment, the time counter 33 of the unit 20 is operated in synchronization with the time counter 13 of the PLC 10. That is, the same initial setting time and reference number as the initial setting time and reference number that are set in the time counter 13 are set in the time counter 33. When the operation of the control system 1 is started, the unit 20 starts an operation simultaneously with the PLC 10. Accordingly, it is guaranteed that the time counter 33 starts the time counting simultaneously with the time counter 13. The time counter 33 starts the time counting using the initial setting time as a starting point when the unit 20 starts the operation. Then, when the counted number reaches a reference number, in other words, when a predetermined time elapses after the counting starts, the transfer control part 32 outputs an instruction signal (a second signal) that instructs output of the mask signal to the transfer control part 32 to the transfer control part 32.

The output timing of the mask signal is set to the same point of time as the timing when the CPU 11 starts transfer of the control data. Accordingly, for example, in a state in which transfer of the control data is started immediately after the CPU 11 receives the instruction signal, the output timing of the mask signal is set to the same point of time as the output timing of the instruction signal from the time counter 13 to the CPU 11. Meanwhile, in a state in which transfer of the control data is started after specific processing is first executed when the CPU 11 receives the instruction signal, the output timing of the mask signal may be set to a point of time after the output timing of the instruction signal from the time counter 13 to the CPU 11 by a time required to execute the specific processing.

The transfer control part 32 outputs a predetermined mask signal to the DMAC 31 with reception of the instruction signal as a trigger. The mask signal is a signal that instructs the DMAC 31 on whether large capacity data transfer is allowed, and takes a signal level of either a high level or a low level. The transfer of the large capacity data by the DMAC 31 is prohibited while the mask signal is at a high level, and the transfer of the large capacity data by the DMAC 31 is permitted while the mask signal is at a low level. Details of this will be described below in detail with reference to FIG. 2 or the like.

(Flow of Data Transfer)

FIG. 2 is a sequence diagram showing an example of a flow of processing by the control system 1 according to the embodiment. The time counter 13 outputs the instruction signal to the CPU 11 at a time t1. The CPU 11 starts a control cycle C1 at the time t1, and thus starts control data processing. Here, processing of reading the control data from the memory 12, in other words, processing of transferring the control data in the memory 12 from the memory 12 to the CPU 11 through serial communication on the serial bus 14, is executed.

The time counter 33 is synchronized with the time counter 13. Accordingly, the time counter 33 outputs the instruction signal to the transfer control part 32 at the time t1. The transfer control part 32 outputs a high level mask signal to the DMAC 31 at the time t1. Accordingly, the processing of transferring the large capacity data to the memory 12 by the DMAC 31 is prohibited. Accordingly, the DMAC 31 does not access the memory 12 at the time t1. Accordingly, memory contention with respect to the memory 12 does not occur at the time t1.

Information representing a processing time Tcpu required for processing of the control data by the CPU 11 is previously set in the unit 20 in each control cycle. The transfer control part 32 determines the duration T1 (a first duration) in which output of the high level mask signal is continued for each control cycle based on the information. The duration T1 may be greater than the processing time Tcpu, but the lengths are equal to each other in the example of FIG. 2. In addition, the duration T1 may overlap at least the duration occupied by the processing time Tcpu in the control cycle C1, and both completely overlap each other in the example of FIG. 2. The CPU 11 continues transfer of the control data from the time t1 to a time t2 after the time t1 by the processing time Tcpu. The transfer control part 32 continues output of the high level mask signal from the time t1 to the time t2 after the duration T1 elapses. Accordingly, since the transfer of the large capacity data by the DMAC 31 is prohibited from the time t1 to the time t2, the CPU 11 can read the control data from the memory 12 without causing memory contention.

The CPU 11 terminates the transfer of the control data and executes other processing after the time t2. The transfer control part 32 terminates the duration T1 at the time t2, and starts the duration T2 (a second duration) in which the output of the low level mask signal continues for each control cycle. That is, the transfer control part 32 outputs the low level mask signal to the DMAC 31 at the time t2. Accordingly, transfer of the large capacity data by the DMAC 31 is permitted for the time t2. Accordingly, the DMAC 31 starts the transfer of the large capacity data for the time t2. The transfer control part 32 maintains the mask signal at a low level until the next instruction signal is input from the time counter 33, i.e., until a termination point of time of the control cycle C1.

The CPU 11 can access the memory 12 according to necessity from the time t2 to a time t3 (equal to the duration T2). Accordingly, occurrence of memory contention is allowed for the duration T2. When the CPU 11 does not access the memory 12 in the duration T2, the DMAC 31 can continue the transfer of the large capacity data from the memory 12 to the DMAC 31 with no delay without causing memory contention with the CPU 11 in the duration T2. Meanwhile, when the CPU 11 accesses the memory 12 in the duration T2, the DMAC 31 can continue transfer of the large capacity data while causing memory contention between the DMAC 31 and the CPU 11. Here, while some delay may occur in the transfer of the large capacity data, such a delay is not a big issue for the unit 20.

In the time t3, the time counter 13 outputs the next instruction signal to the CPU 11, and thus the control cycle C1 is terminated. The CPU 11 starts the next control cycle C2 at the time t3, and thus starts processing of the control data at the time t3. The time counter 33 outputs the next instruction signal to the transfer control part 32 at the time t3. Accordingly, the transfer control part 32 outputs a high level noise signal to the DMAC 31.

A sequence of the transfer of control data and large capacity data in the control cycle C2 is the same as that in the control cycle C1. As a result, since the mask signal is maintained at a high level for the duration T1 from the time t3 to a time t4 (the time t3+Tcpu) in the control cycle C2, the CPU 11 can read the control data from the memory 12 without causing memory contention with the DMAC 31. In addition, while there may be occurrence of memory contention to some extent from the time t4 to a time t5, i.e., during the remaining duration T2 after the time t4 in the control cycle C1, the DMAC 31 can steadily transfer the large capacity data from the memory 12.

The PLC 10 and the unit 20 execute the same processing as the control cycles C1 and C2 in each control cycle after the control cycle C2. Accordingly, the CPU 11 can exclusively execute transfer processing of the control data without causing memory contention with the DMAC 31 in the duration T1 in each control cycle.

(Main Effects)

In the embodiment, even when the unit 20 and the CPU 11 share the memory 12, in the duration T1 in which the control data is transferred in each control cycle, the control data can be transferred without causing the memory contention. Accordingly, a transfer delay of the control data due to the memory contention does not occur. Further, since it is not necessary to execute the arbitration processing for the CPU 11 to prevent the memory contention, each control cycle of the CPU 11 is not delayed by executing the arbitration processing. In this way, since there is no delay of the control cycle due to memory contention or arbitration processing, the CPU 11 can control the control object with a stable control cycle. In particular, when the CPU 11 accesses the memory 12 for a control cycle of 125 micro seconds or less, the arbitration processing that requires several micro seconds is not necessary, and thus, the identity and stability of each control cycle can be further enhanced. In addition, even when the CPU 11 and the DMAC 31 are separate devices (mounted as separate integrated circuits), the control cycle of the CPU 11 can be maintained correctly.

Further, the DMAC 31 does not need to output the request signal that requires the output of the mask signal to the transfer control part 32, and thus, it is also not necessary for the DMAC 31 to receive the ACK from the transfer control part 32 that permits the transfer control part 32 to output the mask signal. Accordingly, the processing load of the DMAC 31 can also be reduced.

(Variant)

The DMAC 31 may periodically mirror the large capacity data between the memory 12 and the memory 22. Accordingly, the large capacity data stored in the memory 12 and the large capacity data stored in the memory 22 can be periodically the same. The mirroring is executed during the duration T2 in each control cycle.

Embodiment 2

Hereinafter, an embodiment related to another aspect of the present invention (hereinafter, referred to as "the embodiment") will be described with reference to the accompanying drawings.

§ 2 Configuration Example (Configuration of Control System 1A)

Figure 3:
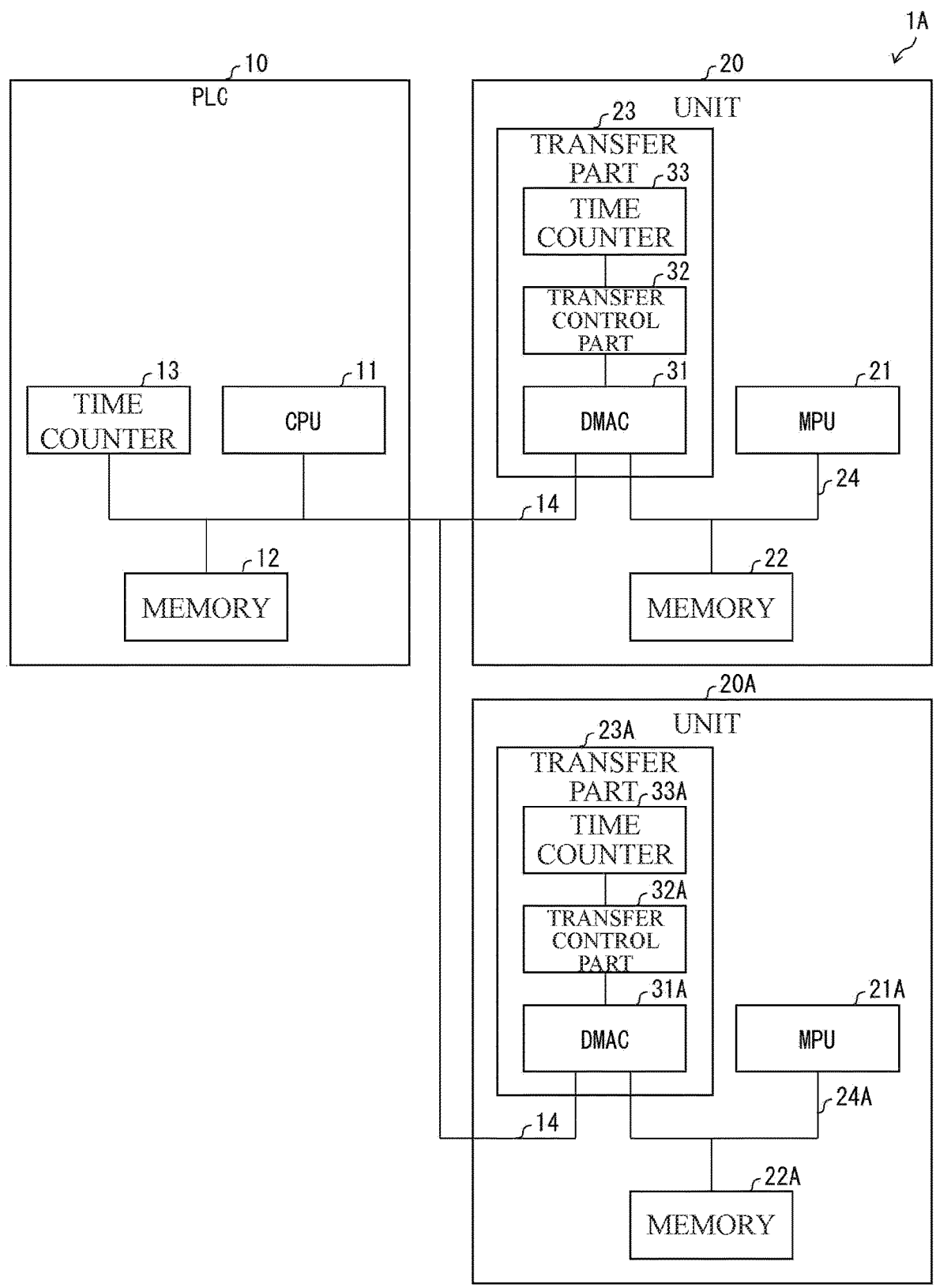
FIG. 3 is a block diagram showing a major part configuration of a control system according to Embodiment 2 of the present invention.

FIG. 3 is a block diagram showing a major part configuration of a control system 1A according to an embodiment. In the example shown, the control system 1A includes a PLC 10, a unit 20, and a unit 20A. Since internal configurations of the PLC 10 and the unit 20 of FIG. 3 are the same as the internal configurations of the PLC 10 and the unit 20 of FIG. 1, detailed description thereof is not repeated. The unit 20A is the same as the unit 20, and the internal configuration of the unit 20A is the same as that of the unit 20. That is, it can be said that the control system 1A is a system including the plurality of units 20. In the embodiment, in order to discriminate both of them, reference sign A is added to each member included in the unit 20A. For example, the MPU 21A is an MPU included in the unit 20A.

In the control system 1A, the CPU 11, the DMAC 31, and the DMAC 31A are connected to the serial bus 14. Accordingly, the CPU 11, the DMAC 31, and the DMAC 31A share the memory 12. Like the DMAC 31, the DMAC 31A is realized as an integrated circuit formed independently and separately from the CPU 11. Each of the DMACs 31 and 31A is also executed as integrated circuits formed dependently and separately from each other.

(Flow of Data Transfer)

The control system 1A according to the embodiment time-divides the duration T2 in which the units 20 and 20A access the memory 12. That is, the duration T2 is assigned to a different control cycle for each unit 20. Specifically, the duration T2 is assigned to the unit 20 in a certain control cycle C1, and the duration T2 is assigned to the unit 20A in another control cycle C2. The units 20 and 20A can access the memory 12 at different timings (in different durations T2) by control of these. Here, in the duration T1, the CPU 11, the DMAC 31, and the DMAC 31A do not cause the memory contention. In addition, in each duration T2, the units 20 and 20A do not cause the memory contention.

Figure 4:
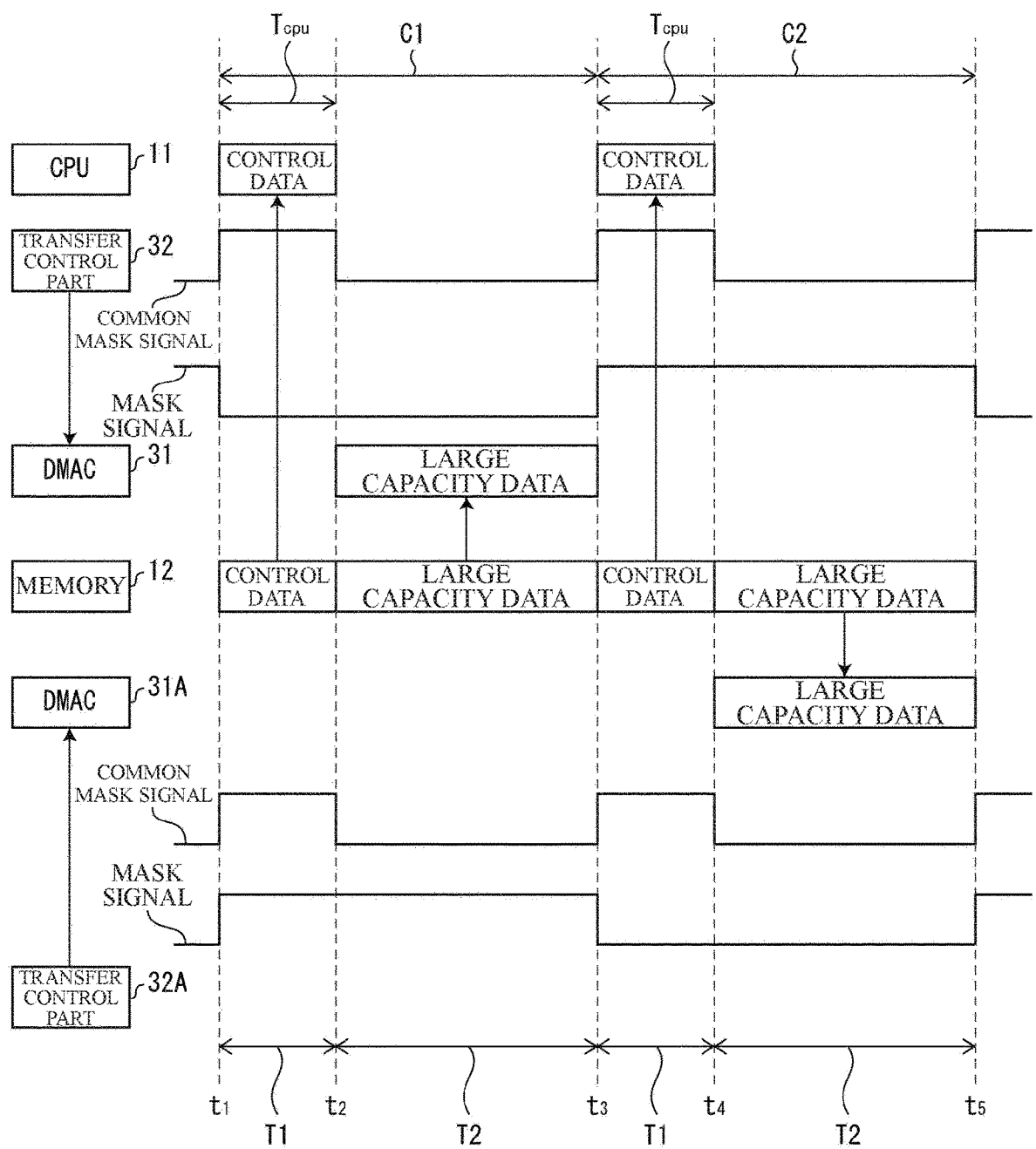
FIG. 4 is a sequence diagram showing an example of a flow of processing by the control system according to Embodiment 2 of the present invention.

FIG. 4 is a sequence diagram showing an example of a flow of processing by the control system 1A according to the embodiment. In the time t1, the time counter 13 outputs the instruction signal to the CPU 11. Accordingly, the CPU 11 starts the control cycle C1 at the time t1, and starts the control data processing. The time counters 33 and 33A are synchronized with the time counter 13. Accordingly, the time counter 33 outputs the instruction signal to the transfer control part 32 at the time t1, and the time counter 33A outputs the instruction signal to the transfer control part 32A at the time t1.

In the embodiment, the transfer control part 32 outputs the mask signal and the common mask signal to the DMAC 31 at the time t1. The common mask signal is a signal that instructs whether transfer of the large capacity data is allowed to the DMAC 31. When at least one of the mask signal and the common mask signal is at a high level, transfer of the large capacity data by the DMAC 31 is prohibited. When both of the mask signal and the common mask signal are at a low level, transfer of the large capacity data by the DMAC 31 is permitted.

The transfer control part 32A outputs a mask signal A and a common mask signal A to the DMAC 31A at the time t1. The common mask signal A is a signal that instructs whether transfer of the large capacity data is allowed to the DMAC 31A. At least one of the mask signal A and the common mask signal A is at a high level, transfer of the large capacity data by the DMAC 31A is prohibited. When both of the mask signal A and the common mask signal A are at a low level, transfer of the large capacity data by the DMAC 31A is permitted.

As shown in FIG. 4, the common mask signal and the common mask signal A have the same waveform. In that sense, these signals can be said to be signals that designate a duration in which transfer of the large capacity data is commonly prohibited for both of the DMACs 31 and 31A.

The transfer control part 32 outputs a high level mask signal and a low level common mask signal to the DMAC 31 at the time t1. Accordingly, processing of transferring the large capacity data to the memory 12 by the DMAC 31 is prohibited. The transfer control part 32A outputs the high level mask signal A and the high level common mask signal A to the DMAC 31A at the time t1. Accordingly, processing of transferring the large capacity data to the memory 12 by the DMAC 31A is also prohibited. Accordingly, the DMAC 31 and 31A do not access the memory 12 at the time t1. Accordingly, since the memory contention with respect to the memory 12 does not occur at the time t1, the CPU 11 can read the control data from the memory 12 with no delay.

The processing of the CPU 11 in each control cycle is the same as that of Embodiment 1. The CPU 11 continues transfer of the control data from the time t1 to the time t2. Since the current output level of each mask signal is maintained from the time t1 to the time t2, the memory contention does not occur.

The CPU 11 terminates transfer of the control data at the time t2. The transfer control part 32 outputs the low level common mask signal to the DMAC 31 at the time t2, and maintains output of the low level mask signal. Accordingly, transfer of the large capacity data by the DMAC 31 is permitted. Accordingly, the DMAC 31 starts transfer of the large capacity data from the memory 12 to the DMAC 31 at the time t2. Meanwhile, the transfer control part 32A outputs the low level common mask signal A to the DMAC 31A and maintains the output of the high level mask signal A at the time t2. Accordingly, the transfer prohibition of the large capacity data by the DMAC 31A is maintained. Accordingly, the DMAC 31A does not start transfer of the large capacity data at the time t2.

The transfer control part 32 maintains the current output level of the mask signal and the common mask signal until the next instruction signal is input, i.e., till the time t3 that is a termination point of time of the control cycle C1. The transfer control part 32A also maintains the current output level of the mask signal A and the common mask signal A until the next instruction signal is input, i.e., till the time t3 that is a termination point of time of the control cycle C1. Meanwhile, the CPU 11 does not access the memory 12 from the time t2 to the time t3. Accordingly, the DMAC 31 continues transfer of the large capacity data from the memory 12 to the DMAC 31 without causing the memory contention between the CPU 11 and the DMAC 31A from the time t2 to the time t3.

At the time t3, the time counter 13 outputs the next instruction signal to the CPU 11, the time counter 33 outputs the next instruction signal to the transfer control part 32, and the time counter 33A outputs the next instruction signal to the transfer control part 32A. Accordingly, the control cycle C1 is terminated. The CPU 11 starts the next control cycle C2 at the time t3, and starts the transfer of the control data.

The transfer control part 32 outputs the high level mask signal and the high level common mask signal to the DMAC 31 at the time t3. Accordingly, processing of transferring the large capacity data to the memory 12 by the DMAC 31 is prohibited. The transfer control part 32A outputs the high level mask signal A and the low level common mask signal A to the DMAC 31A at the time t3. Accordingly, processing of transferring the large capacity data to the memory 12 by the DMAC 31A is also prohibited. Accordingly, the DMACs 31 and 31A do not access the memory 12 at the time t3. Accordingly, since the memory contention with respect to the memory 12 does not occur at the time t3, the CPU 11 can read the control data from the memory 12 with no delay.

The CPU 11 continues transfer of the control data from the time t3 to the time t4. Since the current output level of each mask signal is maintained from the time t3 to the time t4, the memory contention does not occur.

The CPU 11 terminates transfer of the control data at the time t4. The transfer control part 32 outputs the low level common mask signal to the DMAC 31 at the time t4, and maintains output of the high level mask signal. Accordingly, transfer prohibition of the large capacity data by the DMAC 31 is maintained. Accordingly, the DMAC 31 does not start transfer of the large capacity data at the time t4. Meanwhile, the transfer control part 32A outputs the low level common mask signal and the low level mask signal to the DMAC 31A at the time t4. Accordingly, transfer of the large capacity data by the DMAC 31A is permitted. Accordingly, the DMAC 31A starts transfer of the large capacity data at the time t4.

The transfer control part 32 maintains the current output level of the mask signal and the common mask signal until the next instruction signal is input, i.e., till the time t5 that is a termination point of time of the control cycle C2. The transfer control part 32A also maintains the current output level of the mask signal A and the common mask signal A until the next instruction signal is input, i.e., till the time t5 that is a termination point of time of the control cycle C2. Meanwhile, the CPU 11 does not access the memory 12 from the time t4 to the time t5. Accordingly, the DMAC 31A continues transfer of the large capacity data from the memory 12 to the DMAC 31A without causing the memory contention between the CPU 11 and the DMAC 31 from the time t4 to the time t5.

(Main Effects)

In the embodiment, even when the plurality of units 20 and 20A share the memory 12 together with the CPU 11, it is possible to transfer the control data without causing the memory contention during the duration T1 in each control cycle. Accordingly, since a transfer delay of the control data due to the memory contention does not occur, each control cycle is not delayed. Further, since there is no need to execute the arbitration processing with respect to the CPU 11 to prevent the memory contention, each control cycle is also not delayed due to execution of the arbitration processing. Accordingly, since each control cycle is not delayed, the PLC 10 can control the control object with a stable cycle. In particular, when the CPU 11 accesses the memory 12 for a cycle of 125 micro seconds or less, arbitration processing that requires several micro seconds is not necessary, and thus, identity and stability of each cycle can be further enhanced.

Further, since the memory contention between the DMAC 31 and the DMAC 31A does not occur during the duration T2 in each control cycle, the DMACs 31 and 31A can stably transfer the large capacity data during the duration T2 assigned thereto with no delay.

Embodiment 3

Hereinafter, an embodiment according to another aspect of the present invention (hereinafter, also referred to as "the embodiment") will be described with reference to the accompanying drawings.

§ 2 Configuration Example

A configuration of the control system 1A according to the embodiment is the same as that of Embodiment 2. However, the DMACs 31 and 31A transfer the large capacity data at the same time in the same control cycle. Here, the duration in which the units 20 and 20A access the memory 12 is time-divided by a smallest payload unit of the large capacity data. The transfer control parts 32 and 32A output only the mask signal or the mask signal A without outputting the common mask signal. In addition, the length of the duration T1 and the start timing of the duration T2 in the same control cycle are different from each other in each unit 20. Further, in each of the unit 20 and the unit 20A, the start timing of the duration T2 and the duration T2 in another control cycle C2 are different from each other in a certain control cycle C1.

(Flow of Data Transfer)

Figure 5:
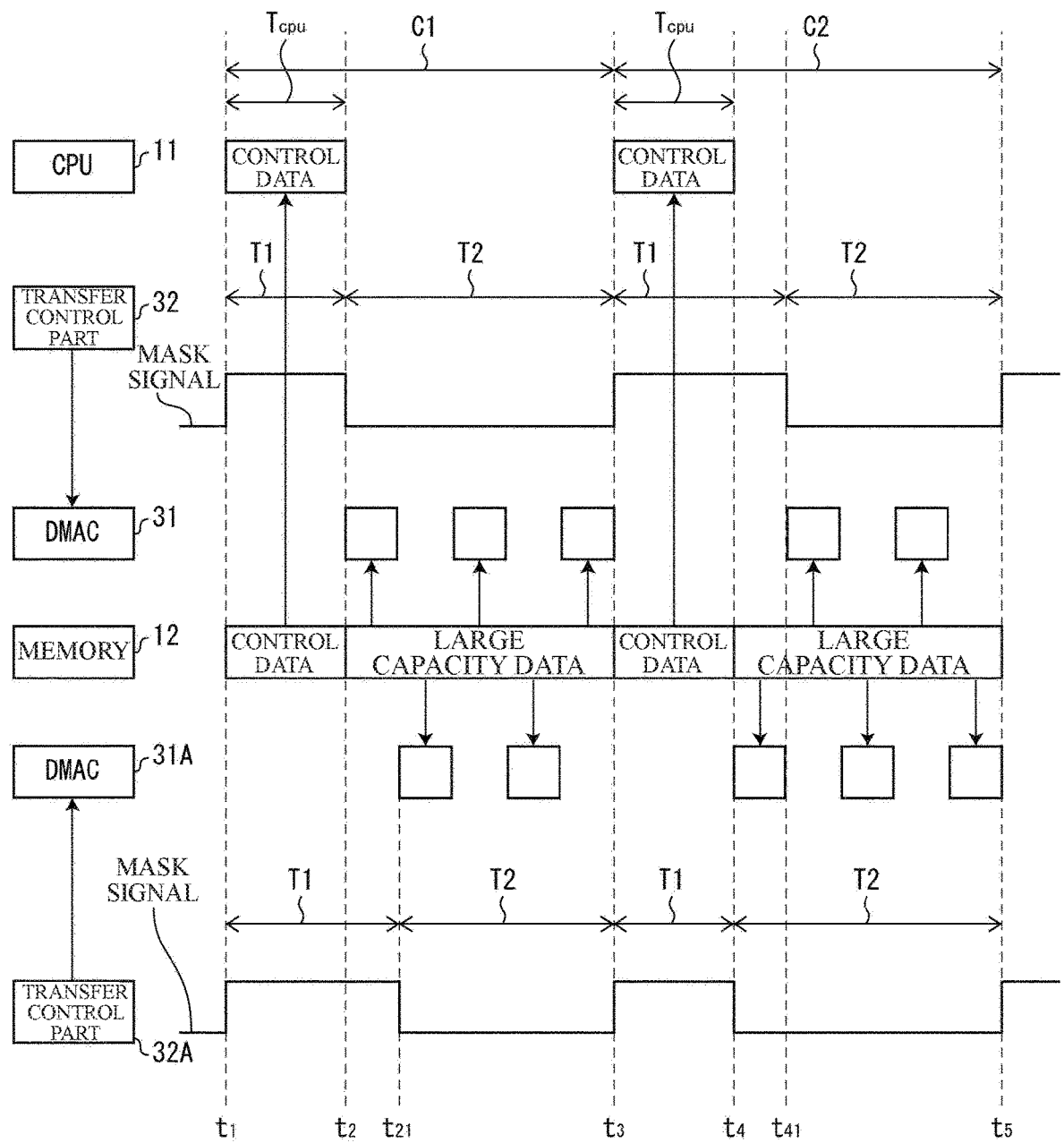
FIG. 5 is a sequence diagram showing an example of a flow of processing by a control system according to Embodiment 3 of the present invention.

FIG. 5 is a sequence diagram showing an example of a flow of processing by the control system 1A according to the embodiment. The processing of the control data by the CPU 11 is the same as that of Embodiment 1 or the like. That is, the CPU 11 transfers the control data from the time t1 to the time t2. The transfer control part 32 outputs the high level mask signal to the DMAC 31 from the time t1 to the time t2. The transfer control part 32A outputs the high level mask signal to the DMAC 31A from the time t1 to the time t2. Accordingly, the control data is transferred without causing the memory contention with the CPU 11.

The transfer control part 32 outputs the low level mask signal to the DMAC 31 at the time t2. Accordingly, the DMAC 31 starts transfer of the large capacity data at the time t2. Meanwhile, the transfer control part 32A maintains output of the high level mask signal A at the time t2. Accordingly, the DMAC 31A does not start transfer of the control data at the time t2.

A transfer time Tpd required to transfer data of a smallest payload size (hereinafter, smallest payload data) of the large capacity data is set to the transfer control parts 32 and 32A. The smallest payload data is data of a minimum unit communicated during serial communication on the serial bus 14. The DMAC 31 divides the large capacity data of the transfer object into a plurality of smallest payload data, and transfer processing on the serial bus 14 is sequentially executed for the smallest payload data.

The transfer control part 32 maintains output of the low level mask signal from the time t2 to the time t3. The transfer control part 32A continues output of the high level mask signal A from the time t2 to a time t21 in which the transfer time Tpd is added to the time t2. Accordingly, the DMAC 31 completes transfer of the smallest payload data from the time t2 to the time t21.

The DMAC 31A outputs the low level mask signal A to the DMAC 31A at the time t21. Accordingly, the DMAC 31A starts transfer of the large capacity data. Here, since the DMAC 31 executes transfer of the large capacity data, the memory contention occurs between the DMAC 31 and the DMAC 31A. Accordingly, the DMAC 31A and the DMAC 31 alternately transfer the smallest payload data to the memory 12. That is, after the time t21, first, the DMAC 31A transfers the smallest payload data from the memory 12, and after the completion, the DMAC 31 transfers the smallest payload data from the memory 12. These processings are alternately executed from the time t21 to the time t3. Accordingly, as shown in FIG. 5, in the control cycle C1, the DMAC 31 succeeds in transfer of three smallest payload data, and the DMAC 31A succeeds in transfer of two smallest payload data.

The control cycle C2 is started at the time t3, and the CPU 11 transfers the control data from the time t3 to the time t4. Here, since both of the mask signal and the mask signal A are maintained at a high level, the CPU 11 can read the control data from the memory without causing the memory contention.

The transfer control part 32A outputs the low level mask signal A to the DMAC 31A at the time t4. Accordingly, the DMAC 31A starts transfer of the large capacity data at the time t4. The transfer control part 32A maintains output of the low level mask signal A from the time t4 to the time t5. The transfer control part 32 continues output of the high level mask signal from the time t4 to a time t41 in which the transfer time Tpd is added to the time t4. Accordingly, the DMAC 31A can compete transfer of the smallest payload data without causing the memory contention between the CPU 11 and the DMAC 31 from the time t4 to the time t41.

The DMAC 31 outputs the low level mask signal A to the DMAC 31 at the time t41. Accordingly, the DMAC 31 starts transfer of the large capacity data. Here, since the DMAC 31A also executes transfer of the large capacity data, the memory contention occurs. Accordingly, the DMAC 31A and the DMAC 31 are configured to alternately transfer the smallest payload data to the memory 12. That is, after the time t41, first, the DMAC 31 transfers the smallest payload data from the memory 12, and after the completion, the DMAC 31A transfers the smallest payload data to the memory 12. These processings are alternately executed from the time t21 to the time t3. Accordingly, as shown in FIG. 5, in the control cycle C2, the DMAC 31 succeeds in transfer of two smallest payload data, and the DMAC 31A succeeds in transfer of three smallest payload data.

(Main Effects)

After transfer completion of the control data, only the DMAC 31 first starts transfer of the large capacity data at the time t2 in the control cycle C1, and only the DMAC 31A first starts transfer of the large capacity data at the time t4 in the control cycle C2. Accordingly, immediately after transfer of the large capacity data is started, it is possible to prevent communication by the plurality of units 20 from concentrating on the serial bus 14.

In each of the units 20, timings when transfer of the large capacity data is started are different for control cycles. Accordingly, in each control cycle, since only either the unit 20 or 20A does not preferentially transfer a larger amount of data, a transfer speed in each of the units 20 can be made uniform. In fact, as shown in FIG. 5, when a transfer number of the smallest payload data in the control cycle C1 and C2 is added up for each of the units 20, 3+2=5 in the unit 20 and 3+2=5 in the unit 20A, and thus, both are equal. For this reason, the transfer number of the smallest payload data in the predetermined duration in each of the units 20 is equal for each of the units 20, which means that the transfer speed of the large capacity data is the same regardless of the units 20.

Embodiment 4

Hereinafter, an embodiment according to another aspect of the present invention (hereinafter, also referred to as "the embodiment") will be described with reference to the accompanying drawings.

§ 2 Configuration Example (Configuration of Control System 1B)

Figure 6:
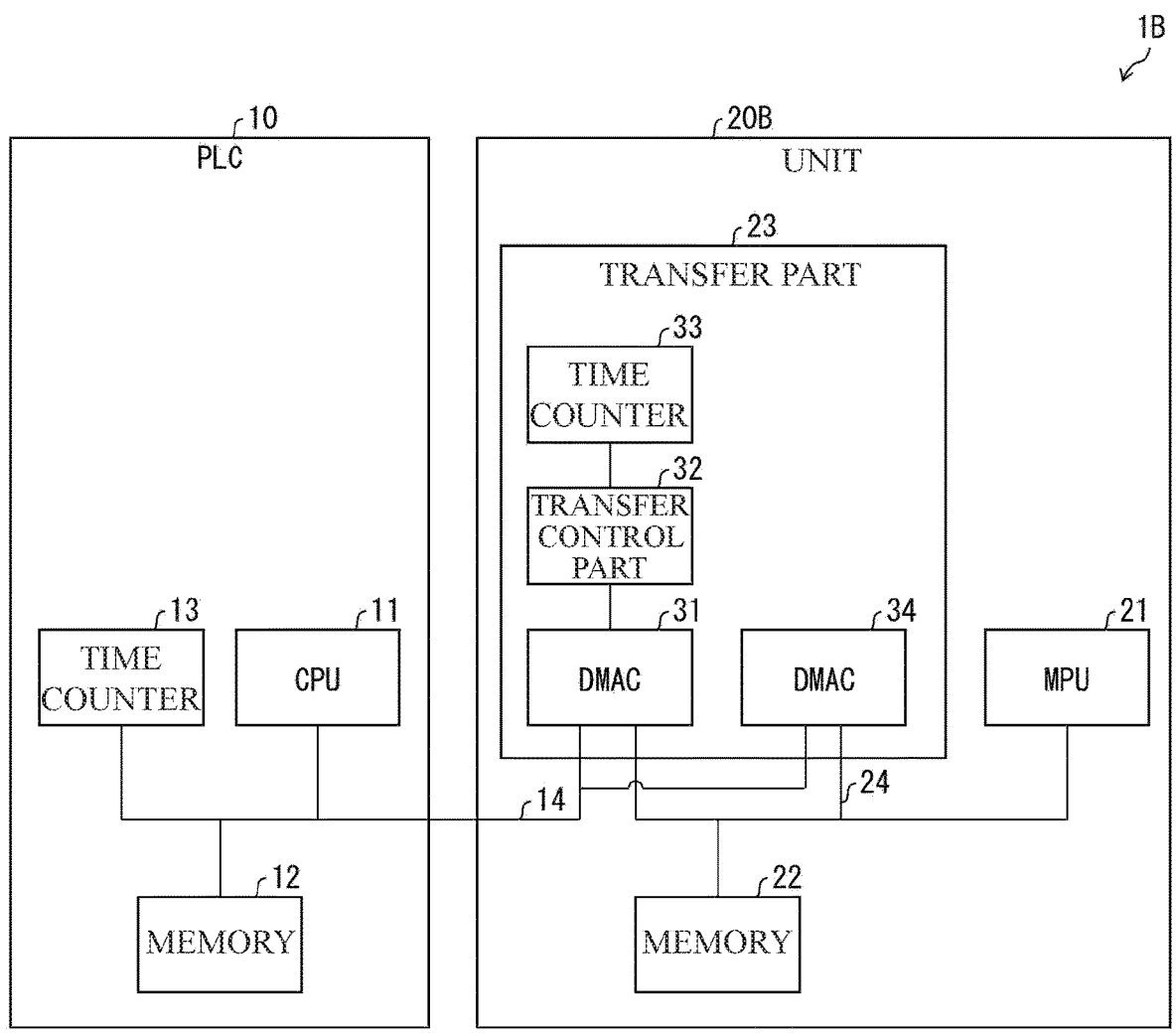
FIG. 6 is a block diagram showing a major part configuration of a control system according to Embodiment 4 of the present invention.

FIG. 6 is a block diagram showing a major part configuration of a control system 1B according to an embodiment. In the example shown, the control system 1B includes a PLC 10 and a unit 20B. Since the internal configuration of the PLC 10 of FIG. 6 is the same as the internal configuration of the PLC 10 of FIG. 1, detailed description thereof is not repeated. The unit 20B further includes a DMAC 34 in addition to the members included in the unit 20 of Embodiment 1.

The DMAC 34 is provided on the transfer part 23, and connected to the serial bus 14 and the serial bus 24. In the embodiment, high priority data (specific data) is stored in the memory 22, and the DMAC 34 has a role of transferring the high priority data to the PLC 10 according to the control by the MPU 21. The high priority data is data that the control system 1B needs to process with high priority, for example, data that instructs the emergency stop of the system. The DMAC 34 can ignore this and transfer the high priority data to the memory 12 through the serial bus 14 even when the mask signal is at a high level.

(Flow of Data Transfer)

Figure 7:
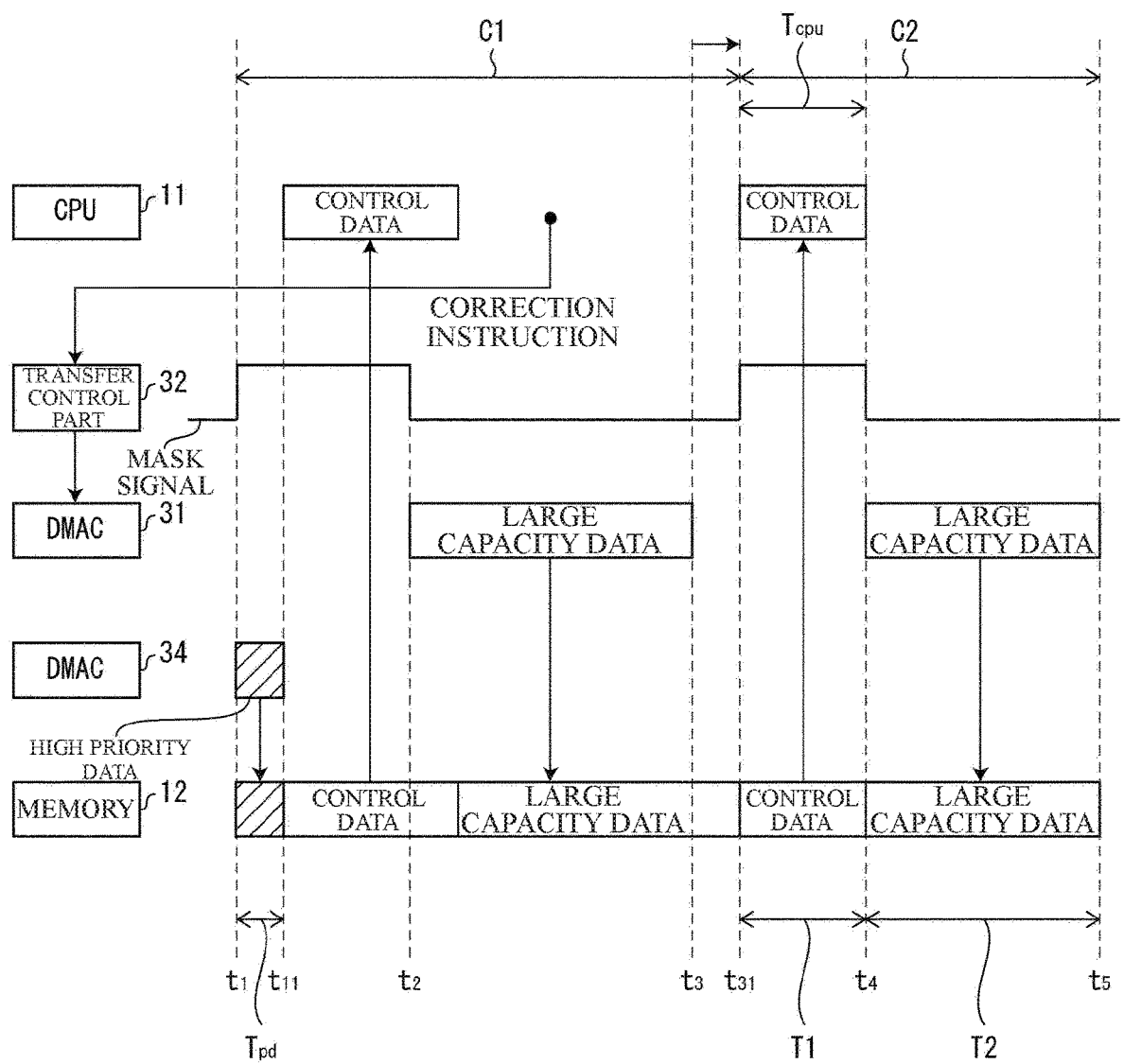
FIG. 7 is a sequence diagram showing an example of a flow of processing by the control system according to Embodiment 4 of the present invention.

FIG. 7 is a sequence diagram showing an example of a flow of processing by the control system 1A according to the embodiment. Hereinafter, an example in which the DMAC 31 transfers the large capacity data from the memory 22 to the memory 12 will be described. The time counter 13 outputs the instruction signal to the CPU 11 at the time t1. Accordingly, the CPU 11 starts the control cycle C1 at the time t1, and starts processing of the control data. The time counter 33 outputs the instruction signal to the transfer control part 32 at the time t1, and thus, the transfer control part 32 outputs the high level mask signal to the DMAC 31. Accordingly, the DMAC 31 does not start transfer of the large capacity data at the time t1. Further, the mask signal is not output to the DMAC 31B.

The MPU 21 detects that an event has occurred in which the high priority data should be transferred to the PLC 10 at the time t1. Accordingly, the MPU 21 instructs the DMAC 34 to transfer the high priority data. The DMAC 34 receives this and starts transfer of the high priority data to the memory 12 at the time t1. While the CPU 11 starts transfer of the control data at the time t1, since the high priority data is transferred to the memory 12 in preference to the control data, the transfer start of the control data in actuality is delayed till the time t11 when transfer of the high priority data to the memory 12 is completed. That is, when the transfer of the high priority data is completed at the time t1, the transfer of the control data is started again. Since the transfer of the control data is delayed by a time required to transfer the high priority data, it is not completed yet at the time t2.

The transfer control part 32 outputs the low level mask signal to the DMAC 31 at the time t2. The DMAC 31 starts transfer of the large capacity data at the time t2. Here, since the memory contention occurs because the control data is still being transferred. Accordingly, writing of the large capacity data on the memory 12 is started after the transfer of the control data is completed.

In FIG. 7, since the transfer of the control data is delayed in the control cycle C1, the control cycle C1 is also extended by that extent. At this rate, since the time counter 13 and the time counter 33 output the instruction signals before the control cycle C1 is completed, a correct termination point of time of the control cycle C1 does not coincide with a correct start point of time of the control cycle C2. Here, the CPU 11 outputs a correction instruction that corrects (delays) an instruction signal outputting timing by a time corresponding to a transfer delay time of the control data to each of the time counter 13 and the DMAC 31 through the serial bus 14 at an arbitrary point of time before the control cycle C1 is terminated. The DMAC 31 outputs the received correction instruction to the time counter 33 via the transfer control part 32. The time counter 13 and the time counter 33 correct the timing when the next instruction signal is output based on the received correction instruction. For example, the counted number is changed by subtracting the transfer delay time from the current counted number. Accordingly, since the counted number that has advanced during the transfer delay of the control data can be eliminated, the instruction signal that starts the next control cycle C2 can be output at the correct timing when the control cycle C1 is terminated. Further, the high level mask signal can be output at the start point of time of the next control cycle C2.

In the example of FIG. 7, the time counter 13 outputs the next instruction signal to the CPU 11 at the time t31 after the time t3 by the transfer delay time. The time counter 33 outputs the instruction signal to the transfer control part 32 at the time t31. Accordingly, the transfer control part 32 outputs the high level mask signal to the DMAC 31 at the time t31. As a result, in the control cycle C2, since the transfer duration of the control data coincides with the high level maintaining duration of the mask signal, the CPU 11 can transfer the control data to the memory 12 without causing the memory contention. In addition, after transfer termination of the control data, the DMAC 31 can transfer the large capacity data to the memory 12 without causing the memory contention.

(Main Effects)

Since the high priority data to be processed by the control system 1B with high priority is transferred to the PLC 10 with high priority regardless of the signal level of the mask signal, it is possible to prevent the high priority data from being transferred to the PLC 10. Accordingly, since the control system 1B can reliably and quickly respond in the event of an emergency, stability of the control system 1B can be increased.

(Variant)

In the data transferred by the DMAC 31 that receives transfer control by the mask signal, the high priority data may be included. In this case, a graph is set to the high priority data so that the mask signal can be ignored. When the high priority data to which such a graph is set has been found in the data of the transfer object, the DMAC 31 changes the transfer ranking of the high priority data to the highest level, ignores it even when the mask signal is at a high level, and transfers the high priority data to the memory 12 through the serial bus 14. Accordingly, the high priority data can be written on the memory 12 in preference to the control data and the large capacity data. Accordingly, even in this example, the same advantages as in the embodiment are obtained.

CONCLUSION

The information processing device according to the aspect of the present invention is an information processing device connected to a control device including a first memory connected to a serial bus, a first counter configured to output a first signal for each constant time, and a first communication part connected to the serial bus and configured to communicate with the first memory via the serial bus for a predetermined control cycle based on the first signal, the information processing device including: a second counter operated in synchronization with the first counter and configured to output a second signal for the constant time, and a second communication part connected to the serial bus and configured to communicate with the first memory via the serial bus during a second duration started after the first duration without serial communication with the first memory via the serial bus during a first duration at least overlapping a duration in which the first communication part communicates with the first memory in the control cycle based on the second signal.

According to the configuration, during the first duration in each control cycle, it is guaranteed that only the first communication part communicates with the first memory while the second communication part does not communicate with the first memory. Meanwhile, during the second duration in each control cycle, the second communication part can communication with the first memory, and further, the first communication part may not communicate with the first memory. From these, during the first duration in each control cycle, the first communication part and the second communication part do not cause the memory contention with respect to the first memory. Here, avoidance of the memory contention is realized based on the output of the second counter synchronized with the first counter, and thus, the first communication part does not need to execute the arbitration processing to avoid the memory contention. In this way, the information processing device according to the aspect of the present invention does not cause the memory contention without causing the first communication part of the control device to execute the arbitration processing to prevent the memory contention. Accordingly, the load of the first communication part can also be reduced.

In the above-mentioned configuration, the information processing device according to the aspect of the present invention has a configuration in which the plurality of information processing devices are connected to the control device and the second duration is assigned to different control cycles for the information processing device.

According to the configuration, in each control cycle, since it is guaranteed that only the second communication parts of any information processing device performs communication via the serial bus, it is possible to prevent the second communication parts of each information processing device from causing the memory contention with each other.

In the above-mentioned configuration, the information processing device according to the aspect of the present invention has a configuration in which the plurality of information processing devices are connected to the control device, and the length of the first duration and the start timing of the second duration in the same control cycle are different from each other for each information processing device.

According to the configuration, since the plurality of information processing devices do not start the communication at the same timing in each control cycle, it is possible to prevent the communication by the plurality of information processing devices from being concentrated on the serial bus.

In the above-mentioned configuration, the information processing device according to the aspect of the present invention has a configuration in which start timings of the second duration are different from each other in a certain control cycle and another control cycle for each information processing device.

According to the configuration, since only the specific information processing device does not preferentially perform communication in each control cycle, a communication speed in each information processing device can be made uniform.

In the above-mentioned configuration, the information processing device according to the aspect of the present invention has a configuration in which the second communication part transmits the specific data to the first memory even in the first duration.

According to the configuration, since the specific data, for example, the high priority data to be processed with high priority by the control system is transmitted to the first memory even in the duration in which the first communication part accesses the first memory, it is possible to prevent transmission of the specific data from be delayed. Accordingly, since the control device can respond reliably and quickly in the event of the emergency, stability of the control system can be increased.

In the above-mentioned configuration, the information processing device according to the aspect of the present invention includes a second memory, and the second communication part periodically executes mirroring between the first memory and the second memory.

According to the configuration, the data stored in the first memory and the second memory can be made periodically the same.

[Implemented Example by Software]

A control block (in particular, the transfer part 23 and the DMAC 34) of the units 20, 20A and 20B may be realized by a logical circuit (hardware) formed on an integrated circuit (an IC chip) or the like, or may be realized by software.

In the case of the latter, each of the units 20, 20A and 20B includes a computer configured to execute command of a program that is software of realizing each function. The computer includes, for example, one or more processors, and includes a computer-readable recording medium on which the program is stored. Then, in the computer, the purpose of the present invention is accomplished by reading the program from the recording medium and executing the program using the processor. For example, a central processing unit (CPU) can be used as the processor. As the recording medium, "a non-temporary tangible medium," for example, in addition to the read only memory (ROM) or the like, a tape, a disk, a card, a semiconductor memory, a programmable logical circuit, or the like, may be used. In addition, a random access memory (RAM) or the like configured to deploy the program may be further provided. In addition, the program may be supplied to the computer via an arbitrary transmission medium (a communication network, a broadcast medium, or the like) that can transmit the program. Further, the aspect of the present invention can also be realized in the form of a data signal embedded in a carrier wave, in which the program is embodied by electronic transmission.

The present invention is not limited to each of the above-mentioned embodiments described above, and various modifications may be made without departing from the scope shown in the claims. Embodiments obtained by appropriately combining the technical means disclosed in different embodiments are also included in the technical scope of the present invention. New technical features can also be formed by combining the technical means disclosed in each embodiment.

What is claimed is:

1. An information processing device connected to a control device including a first memory connected to a serial bus, a first counter configured to output a first signal for each constant time, wherein the first signal has a first state and a second state, where the first state is logically opposite to the second state, and a first communication part connected to the serial bus and configured to communicate with the first memory via the serial bus for a predetermined control cycle based on the first signal, wherein the predetermined control cycle is a constant cycle, the information processing device comprising:
a second counter that operates in synchronization with the first counter and is configured to output a second signal, wherein the second signal has the first state and the second state, where the first state is logically opposite to the second state; and
a second communication part connected to the serial bus and configured to communicate with the first memory via the serial bus during a second duration started after a first duration when the second signal is in the second state,
wherein, when the second signal is in the first state, there is no serial communication of the second communication part with the first memory via the serial bus during the first duration,
wherein the first duration at least overlaps with a duration of the first state of the first signal in which the first communication part communicates with the first memory in the control cycle, and wherein a plurality of the information processing devices are connected to the control device, and the second duration is assigned to different control cycles for each of the information processing devices, wherein the second duration assigned to different control cycles has different length of duration.

2. The information processing device according to claim 1, wherein a plurality of the information processing devices are connected to the control device, and
a length of the first duration and a start timing of the second duration in the same control cycle are different from each other for each of the information processing devices.

3. The information processing device according to claim 2, wherein start timings of the second duration are different from each other in a certain control cycle and another control cycle for each information processing device.

4. The information processing device according to claim 1, wherein the second communication part transmits specific data to the first memory even in the first duration.

5. The information processing device according to claim 1, wherein a second memory is provided, and
the second communication part periodically executes mirroring between the first memory and the second memory.

6. The information processing device according to claim 1, wherein the second duration is determined by information obtained from the control device in advance, wherein the information represents a processing time (Tcpu) required for processing of control data by the control device.

7. An information processing device connected to a control device including a first memory connected to a serial bus, a first counter configured to output a first signal for each constant time, wherein the first signal has a first state and a second state, where the first state is logically opposite to the second state, and a first communication part connected to the serial bus and configured to communicate with the first memory via the serial bus for a predetermined control cycle based on the first signal, wherein the predetermined control cycle is a constant cycle, the information processing device comprising:
a second counter that operates in synchronization with the first counter and is configured to output a second signal, wherein the second signal has the first state and the second state, where the first state is logically opposite to the second state; and a second communication part connected to the serial bus and configured to communicate with the first memory via the serial bus during a second duration started after a first duration when the second signal is in the second state, wherein, when the second signal is in the first state, there is no serial communication of the second communication part with the first memory via the serial bus during the first duration, wherein the first duration at least overlaps with a duration of the first state of the first signal in which the first communication part communicates with the first memory in the control cycle, and wherein a plurality of the information processing devices are connected to the control device, a length of the first duration and a start timing of the second duration in the same control cycle are different from each other for each of the information processing devices, start timings of the second duration are different from each other in a certain control cycle and another control cycle for each information processing device, and the second duration assigned to different control cycles has different lengths of duration.

\* \* \* \* \*